Oct. 18, 1932.　　　W. A. MARRISON　　　1,882,849
FREQUENCY CONTROL SYSTEM
Filed July 31, 1929
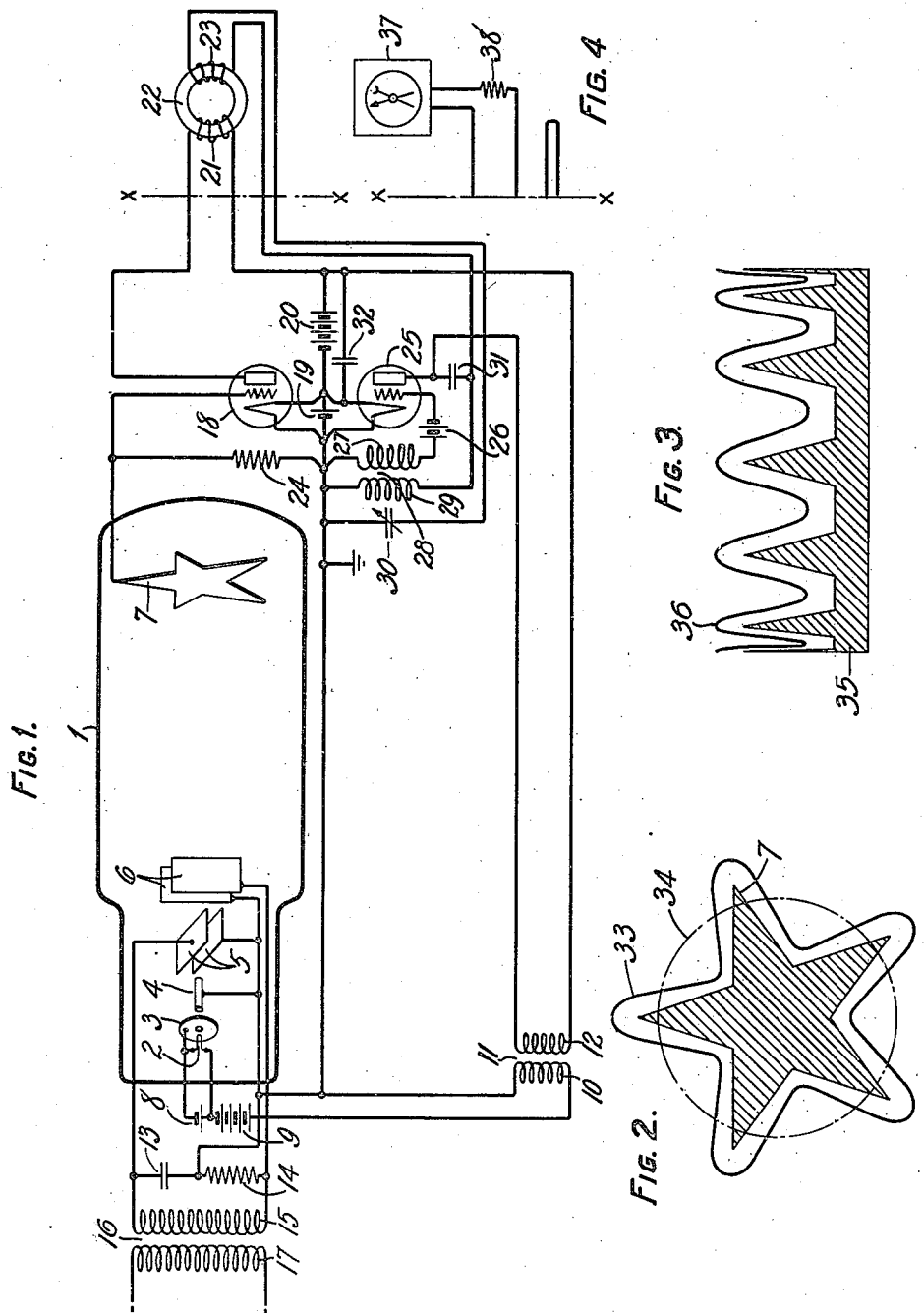
INVENTOR
W. A. MARRISON
BY Guy T. Morris
ATTORNEY Patented Oct. 18, 1932

1,882,849

UNITED STATES PATENT OFFICE

WARREN A. MARRISON, OF MAPLEWOOD, NEW JERSEY, ASSIGNOR TO BELL TELEPHONE LABORATORIES, INCORPORATED, OF NEW YORK, N. Y., A CORPORATION OF NEW YORK

FREQUENCY CONTROL SYSTEM

Application filed July 31, 1929. Serial No. 382,535.

This invention, in a practical form, relates to a harmonic frequency control method or means, and more specifically to a method or organization whereby frequencies of waves from two otherwise independent sources are so constrained as to preserve a given integral harmonic relation.

It is an object of the invention to effect such harmonic control in a more simple and positive manner and with greater inherent stability, than as in accordance with prior means or methods, and with greater economy of plant and of operation.

The invention utilizes the principle that the trace of a cathode ray on an intercepting screen, or in space, is a function both of the characteristics of the wave used, as in a cathode ray oscillograph, to directly deflect the ray, and of the waves impressed between the anode and cathode and concerned more with the velocity of electrons emitted from the cathode. If two voltages of the same frequency but in phase quadrature are impressed on right angularly related pairs of deflecting plates or the like the trace will be a circle or an ellipse repeated at the frequency of the impressed waves. The variable voltage impressed between the anode and cathode will cause ripples in this figure and, if an integral harmonic of the other frequency, the cyclically repeated ripples will, effectively, be fixed in space so as to determine a figure alternative to that of a circle or ellipse and whose number of ripples or protuberances is a function of the particular harmonic relation. A relative change in phase of the two sets of waves such as might initiate a relative change in their frequencies will cause a rotation or precession of this trace. This phenomenon may be made use of as by correspondingly causing a variable intersection of said trace and a fixed target connected to a repeater device, to indicate quantitatively the relative change in frequency or phase or to control the two waves so as to preserve the initial harmonic relation between them.

Although the basic principle af the invention has practical aspects as above, the invention, in its most basic aspect, resides in a simple and practicable method or means for controlling the operation of a cathode ray device by waves from separate sources so as to make evident, for whatever purpose may be desired, a relative change of condition, and more particularly of phase, of the two waves. The principle may be variously applied in addition to the practical applications above, as in the measurements of characteristics of one wave in terms of the other wave, which functions in such a relation as a standard of comparison.

The invention will be described in greater detail in connection with specific applications, reference being made to the accompanying drawing, in which Fig. 1 is a schematic diagram of a harmonic control system which utilizes a cathode ray tube designed in accordance with the invention;

Fig. 2 is a front view of the target or absorbing means employed within the cathode ray tube shown in Fig. 1;

Fig. 3 represents a modification in the target design suitable for use under certain conditions, as hereinafter explained, in place of the target shown in Figs. 1 and 2;

Fig. 4 illustrates another specific embodiment of the invention which may be substituted for the apparatus shown at the right of line XX in Fig. 1.

In Fig. 1 reference numeral 1 designates a cathode ray tube similar in construction to that disclosed in Patent 1,603,284, granted to J. B. Johnson, October 19, 1926, except that the fluorescent screen is omitted in the tube shown in the drawing. The tube contains a cathode 2 from which the electrons emanate, a screening grid 3 adjacent to the cathode and containing an orifice for controlling the size of the ray, and a tubular anode 4 which is positioned opposite to the grid orifice. Two pairs of parallel deflector plates 5 and 6, each pair being adjacent to and at right angles to the other, and a star-shaped target 7 placed in alignment with both the anode and the clearance spaces between the pairs of deflector plates are also included within the tube. The exact design of the target, that is, the determination of the number of protuberances, is governed by the harmonic relation of the waves sought to be compared or controlled and will be fully considered below. The target may, however, be outside the electron traced figure or, in special arrangements, two targets may be used one inside and one outside.

The source of energy designated 8 serves to supply energy for heating the cathode 2 to a temperature at which electrons are freely emitted. A source of energy 9 is included in the anode circuit with its positive terminal connected through winding 10 of transformer 11 to the anode 4 for attracting the emitted electrons. Condenser 13, resistance 14 and primary winding 15 of transformer 16 from a phase-splitter such as is described in my co-pending application dated February 7, 1928, Serial No. 252,628, Patent No. 1,768,262, granted June 24, 1930. The primary windings 12 of transformer 11 and 17 of transformer 16 are connected to sources of relatively high and low frequency waves, respectively, between the frequencies of which it is desired to maintain a given harmonic relation.

Associated with the cathode ray tube 1 is a space discharge tube 18 employed as an amplifier and having the usual cathode, anode and control electrode. The last mentioned element is directly connected to the target 7. Energy for heating the cathode is supplied from source 19. Included in the output circuit is a source of potential 20 having its positive terminal connected to the anode through winding 21 of the magnetic cored transformer 22. The core of this transformer may be iron, permalloy or the like designed so that it may be saturated by the space current from tube 18. The resistance designated by reference numeral 24 serves as a means of permitting electrons to escape from the control electrode to the cathode.

The space discharge tube 25 includes a cathode, anode and control electrode and functions, with its associated circuits, as a generator of the high frequency oscillations to be supplied to transformer 11. Heating energy for the cathode is supplied from source 19 and a positive potential is applied from source 20 to the anode through winding 12. The input circuit includes the secondary winding 27 of feed-back transformer 28 in series with a source of potential 26 for biasing the control electrode. Variable condenser 30 with transformer windings 29 and 23 form an oscillatory circuit which is connected between the anode and cathode. Condenser 31 is merely a blocking condenser of large capacity, which serves to prevent a substantial short-circuit of battery 20 through winding 29 while providing an alternating current path from the anode to the oscillatory circuit. The reference numeral 32 designates a by-pass condenser which provides an alternating current path around battery 20.

Referring to Fig. 2, the front view of target 7 is shown surrounded by a line 33, which represents the beam trace. The dotted line 34 simply indicates, for purposes of explanation, the trace obtained when the high frequency oscillator is not functioning and direct current potential only is applied to the anode of the cathode ray tube.

In Fig. 3 reference numerals 35 and 36 designate respectively a comb-shaped target and the trace obtained when plates 5 are not energized by waves. In using the target of this design the phase-splitter is omitted and consequently a reduction in plant is effected. this design the phase-splitter is omitted and to that of Fig. 2 under most circumstances and the statement of operation presently to be presented is applicable thereto with obvious changes.

In operation, the cathode ray is generated in a well known manner and drawn through the grid 3 and anode 4 toward the target 7. Relatively low frequency waves are supplied to transformer 16 and potentials in quadrature, obtained from these waves by means of the phase-splitter, are impressed on deflector plates 5 and 6. These potentials cause the electron beam to revolve conically and cyclically in accordance with the relatively low frequency waves. The trace obtained on the target due to these potentials is circular or elliptical depending on the relative deflecting potential, a typical example being indicated by the dotted line 34 of Fig. 2. Relatively high frequency waves are supplied at the same time from the oscillator tube 25 and associated circuits, through transformer 11, to the anode circuit for the purpose of varying the positive potential of the anode cyclically as in accordance with the relatively high frequency waves. This variation in turn causes the velocity of the electrons, and consequently the radius of the circular trace, to be similarly varied with the result that the trace assumes the star-shaped pattern shown by line 33 in Fig. 2, the number of points on the pattern being equal to the ratio of the frequencies of the waves supplied. The pattern shown in the drawing represents, for example, a frequency ratio of 5:1.

In accordance with this invention the target 7 is designed to have a contour similar to, and smaller than, the predetermined trace; it is positioned within and relatively close to the trace, and at an equal distance therefrom at all points. Any variation in the ratio of the frequencies is initiated by a relative change of phase which is reflected in a rotation of the star-shaped trace. This in turn causes the beam to impinge upon and energize the target in proportion as such change of phase or tendency toward a frequency change. Also, any excessive alteration in the voltage applied to the anode or the deflector plates as might be caused by a change in the potential of the impressed low or high frequency waves, respectively, will tend to alter the size of the trace and so cause the beam to energize the target. The same result will attend a sufficiently large change in the cathode energization. These last two phenomena suggest other specific uses for the invention other than those to be described in detail below. In the frequency control and frequency measuring systems described below the amplitudes of the impressed waves are assumed to be substantially constant. Slight amplitude fluctuations will not ordinarily affect the operation of these systems in view of the spacing between the target point and the corresponding point of the normal trace. Excessive amplitude variations may be prevented by means of suitable current-limiting devices associated with the oscillator.

The energy absorbed by the target as a result of a change in any of the relations mentioned above may be utilized for various purposes. The system described below in connection with Fig. 1 of the drawing includes certain features of the frequency control system described in my copending application 178,937, filed March 28, 1927, Patent No. 1,788,533, granted January 13, 1931, and merely illustrates one scheme of utilizing this energy. In this system the intercepted energy is used for restoring the original harmonic relation between the high and low frequency waves. More specifically, means are provided whereby the frequency of the waves produced by the high frequency oscillator is changed in accordance with the absorbed energy so as to maintain constant the original frequency ratio.

Referring again to Fig. 1, the manner in which this ratio is maintained constant may be seen from the following brief description. As explained above the intercepted electrons negatively charge the control electrode of space discharge tube 18, and, consequently, produce a change in the output current of the tube. The current variation through winding 21 causes a corresponding variation in the permeability of core 12 and a similar change in the inductance of winding 23 forming a part of the frequency-determining circuit associated with tube 25. The effect of the change in inductance is to cause a change in the frequency of the high frequency oscillations generated by tube 25 and transmitted to transformer 11 and hence in the rotation of the star-shaped trace. Of course, this rotation should be counter in direction to the rotation which initiated the change of frequency. In practice this adjustment will be automatic. That is, the intersections of the target projections and trace will automatically occur at that one of the two sets of similar target projection sides which will make the two frequency changes compensatory. Since the counter effect is proportional to the cause, as a matter of theory, there should be only infinitesimal changes of relative frequency. As a practical matter, the variation of relative frequency is a function of sensitivity of response as a function of the refinement of circuit details.

Aside from the frequency control system just described, the invention is well adapted for use in a system designed to measure the frequency of either wave supplied to the cathode ray tube. If the low frequency meter 37 and resistance 38 shown in Fig. 4 be inserted in the output circuit of tube 18 in place of winding 21, and if winding 23 be removed from the frequency-determining circuit, as shown at the right of line XX in Fig. 1, and the leads to this latter winding short-circuited, as shown in Fig. 4, a system for accomplishing this result is obtained. Upon a variation in the frequency ratio of the two waves the target becomes energized at a frequency which is the "difference" between the high frequency and the nearest multiple of the low frequency; and this "difference" frequency is measured by the meter 37. If the frequency of the waves supplied through transformer 16 or the frequency of the waves generated by oscillator tube 25 is standard, the other frequency may be accurately determined from the difference frequency.

As indicated above, the invention may be applied in various ways and it should be understood that it is not to be limited in its application to the specific embodiments disclosed therein. In fact, the invention is broadly adapted to any system wherein a relative change in condition among a plurality of waves is sought to be determined or utilized.

Furthermore, the choice of the elements comprising the invention is not intended to be limited to those used in the specific system illustrated. Other electron-emitting devices or tubes, either evacuated or gas-contained, may be employed, for example, in place of the Braun tube of Fig. 1; and other means for deflecting the beam such as electro-magnetic coils properly energized and positioned in respect to the beam may be employed in place of the electrostatic means comprising the deflector plates shown on the drawing. Also the high-frequency control may be caused to effect the cathode excitation instead of the anode potential with similar effect.

What is claimed is:

1. The method of determining relative changes between a plurality of wave trains utilizing means for rotating an electron beam conically in accordance with the frequency of one wave train, and means for varying the velocity of the electrons cyclically in accordance with the frequency of another wave train whereby a definite trace is obtained which comprises absorbing energy from the beam only when said trace is varied and utilizing the absorbed electrons to vary the current in an external circuit.

2. A method, using two sources between the frequency of the waves from which it is desired to maintain a given harmonic frequency relation, a cathode ray generating means and a space discharge device, which comprises variably deflecting the cathode ray by means of the wave from one source so as to cause it to cyclically trace a fixed path at the frequency of the deflecting wave, cyclically varying said path at the frequency of the wave from the other source, variably absorbing energy from the resulting cathode ray in its cyclical movement in accordance with the relative change of phase of the two waves, utilizing the absorbed energy to vary the output current of the space discharge device, and controlling the frequency of one of the said sources in accordance with the output current of said device.

3. The method of maintaining a given harmonic frequency relation between waves from a plurality of sources utilizing a cathode ray generating means and an energized space discharge device, which comprises periodically deflecting the ray by means of the waves from one source at the frequency of said waves, periodically varying the deflection of the ray at the frequency of the waves from another source so as to produce a star-shaped trace, absorbing energy from the ray when the trace is varied, transferring the absorbed energy to the control electrode of the energized space discharge device, and utilizing the output current of said device for varying a frequency determining inductance associated with one of the said sources.

4. The method of maintaining the frequency ratio between a plurality of sets of waves constant, utilizing a cathode ray generating device, which comprises conically revolving the cathode ray at the frequency of one of the sets of waves and varying the direction of the revolving ray in accordance with the frequency of another set of waves, intercepting the ray upon a deviation from its normal trace and altering the frequency of one set of waves an amount proportionate to the intercepted energy.

5. The method of measuring the frequency of one set of waves in terms of another, utilizing a cathode ray generating means and a plurality of wave sources, which comprises periodically deflecting the ray in accordance with the frequency of one set of waves, cyclically varying the deflection of the ray in accordance with the frequency of the other set of waves, absorbing energy from the ray upon a variation in the resultant trace, and measuring the frequency at which energy is absorbed.

6. In combination, a device for generating an electron beam, a plurality of wave sources, means controlled by waves from one source for cyclically rotating the beam, means controlled by waves from another source for cyclically varying the velocity of the electrons, means positioned adjacent to the beam and adapted to intercept the said beam only when the resultant trace is varied and means controlled by the absorbed electrons.

7. In combination, a device for generating an electron beam, a plurality of wave sources, means controlled by waves from one source for causing the beam to revolve cyclically, means controlled by waves from another source for varying the velocity of the electrons, means positioned symmetrically to the resulting trace and adapted to become energized by the beam only upon a variation in said trace, and a utilization circuit adapted to be controlled by said last mentioned means.

8. In combination, a device for generating an electron beam, said device including an anode and a pair of deflecting means, a source of waves of a given frequency, means for varying the potential of the anode at the frequency of the said waves, a source of waves of another frequency, means for applying potentials in quadrature to the deflecting means at the frequency of the last mentioned waves, means positioned symmetrically to the resulting trace for absorbing energy from the beam upon a variation in the frequency ratio of the waves, and a space discharge device controlled by the absorbed energy.

9. In combination, means for generating an electron beam, a plurality of sources of waves of different frequency, means controlled by waves from one source for rotating the beam cyclically in accordance with the frequency of the controlling waves, means controlled by waves from another source for varying the velocity of the electrons cyclically in accordance with the frequency of the last mentioned waves whereby a star-shaped trace is obtained, a target similar in contour to said trace and positioned adjacent thereto for intercepting the beam when said trace is varied, and a voltage operated device controlled by the target.

10. In combinaton two sources, between the frequencies of the waves therefrom it is desired to maintain a given frequency harmonic relation, a cathode ray generating means, means employing the wave from one source for variably deflecting the cathode ray so as to cause it to cyclically trace a fixed path at the frequency of the deflecting wave, means for cyclically varying said path at the frequency of the wave from the other source, means for variably absorbing the resulting trace as in accordance with a relative change of phase of the two waves and means controlled by the absorbed waves for varying the frequency of either source so as to preserve the given frequency relation.

11. In combination, a cathode ray device including an anode, a plurality of sources of waves of different frequencies, deflecting plates controlled by waves from one source for rotating the ray cyclically at the frequency of the controlling waves, the anode of said device being controlled by waves from another source for changing the radius of rotation cyclically at the frequency of the last mentioned waves, a target positioned adjacent to the resulting trace for absorbing energy from the ray in accordance with a relative change in the frequency ratio of the controlling waves, and means controlled by said target for changing the frequency of the waves of either source an amount necessary to maintain the said ratio constant.

12. In combination, a cathode ray device including an anode, a plurality of sources of waves of different frequencies, deflecting plates controlled by waves from one source for rotating the ray cyclically at the frequency of the controlling waves, the anode potential of said device being controlled by waves from another source for changing the radius of rotation cyclically at the frequency of the last mentioned waves, a target positioned adjacent to the resulting trace for absorbing energy from the ray in accordance with a relative change in the frequency ratio of the controlling waves, and means controlled by said target for measuring the frequency at which the said energy is absorbed.

In witness whereof, I hereunto subscribe my name this 27th day of July, 1929.

WARREN A. MARRISON.